(12) United States Patent
Singh et al.

(10) Patent No.: US 8,777,278 B2
(45) Date of Patent: Jul. 15, 2014

(54) FLANGE ASSEMBLY WITH IMPROVED SERVICEABILITY

(75) Inventors: Satnam Singh, Kitchener (CA); Kailash C. Vasudeva, Waterloo (CA); Stephen W. Dean, Hamilton (CA)

(73) Assignee: Specialty Innovation and Manufacturing Limited, Waterloo (CA)

( * ) Notice: Subject to any disclaimer, the term of this patent is extended or adjusted under 35 U.S.C. 154(b) by 418 days.

(21) Appl. No.: 12/936,279

(22) PCT Filed: Apr. 6, 2009

(86) PCT No.: PCT/CA2009/000439
§ 371 (c)(1),
(2), (4) Date: Feb. 7, 2011

(87) PCT Pub. No.: WO2009/121189
PCT Pub. Date: Oct. 8, 2009

(65) Prior Publication Data
US 2011/0133451 A1  Jun. 9, 2011

Related U.S. Application Data

(60) Provisional application No. 61/042,364, filed on Apr. 4, 2008, provisional application No. 61/051,730, filed on May 9, 2008.

(51) Int. Cl.
*F16L 23/00* (2006.01)

(52) U.S. Cl.
USPC .......................... 285/368; 285/412; 411/190

(58) Field of Classification Search
USPC ......... 285/368, 412, 363, 405, 913, 413, 423, 285/414, 415, 89; 411/321, 190, 191, 103, 411/172, 177, 179, 180, 181, 337, 354, 968, 411/166, 167, 81, 116, 365, 119, 143, 144, 411/195, 192, 935
See application file for complete search history.

(56) References Cited

U.S. PATENT DOCUMENTS

| 1,884,491 | A | * | 10/1932 | Ziemann | 403/245 |
| 2,544,304 | A | * | 3/1951 | Eckenbeck et al. | 411/180 |
| 3,053,357 | A | * | 9/1962 | Stanger | 403/21 |
| 4,080,081 | A | * | 3/1978 | Wah et al. | 403/237 |
| 4,279,530 | A | * | 7/1981 | Mullenberg | 403/337 |
| 2005/0258642 | A1 | | 11/2005 | Brophy, III et al. | |

FOREIGN PATENT DOCUMENTS

| EP | 1707775 | 10/2006 |
| FR | 2902457 | 12/2007 |
| JP | 2007023849 | 2/2007 |

OTHER PUBLICATIONS

Canadian Intellectual Property Office as International Searching Authority, International Search Report and Written Opinion for International Patent App. No. PCT/CA2009/000439, Jul. 9, 2009.

* cited by examiner

*Primary Examiner* — James Hewitt
*Assistant Examiner* — Jay R Ripley

(57) ABSTRACT

The invention is directed at joint assembly which includes a first part and a second part to be assembled together. The first and second part are secured together via a set of fasteners and a set of attachment portions. The set of attachment portions cooperate with one of the first or second parts and receive the set of fasteners.

12 Claims, 15 Drawing Sheets

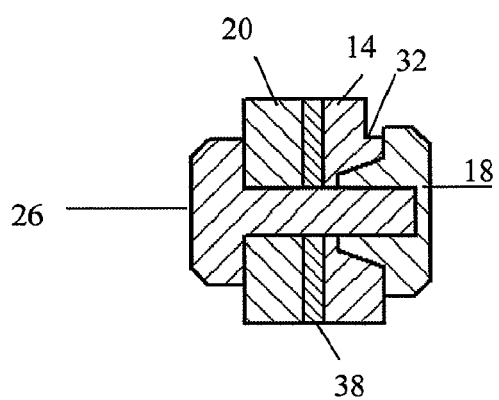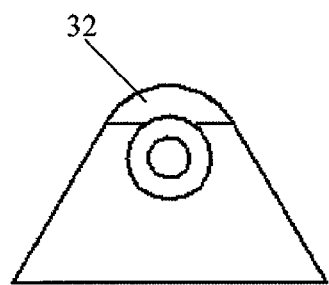
FIG. 3a FIG. 3b
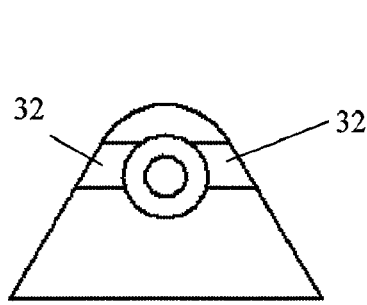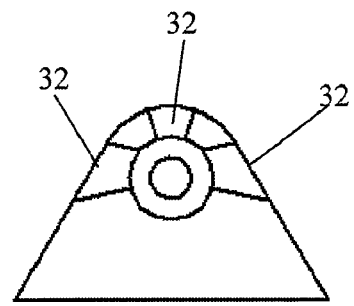
FIG. 3c FIG. 3d

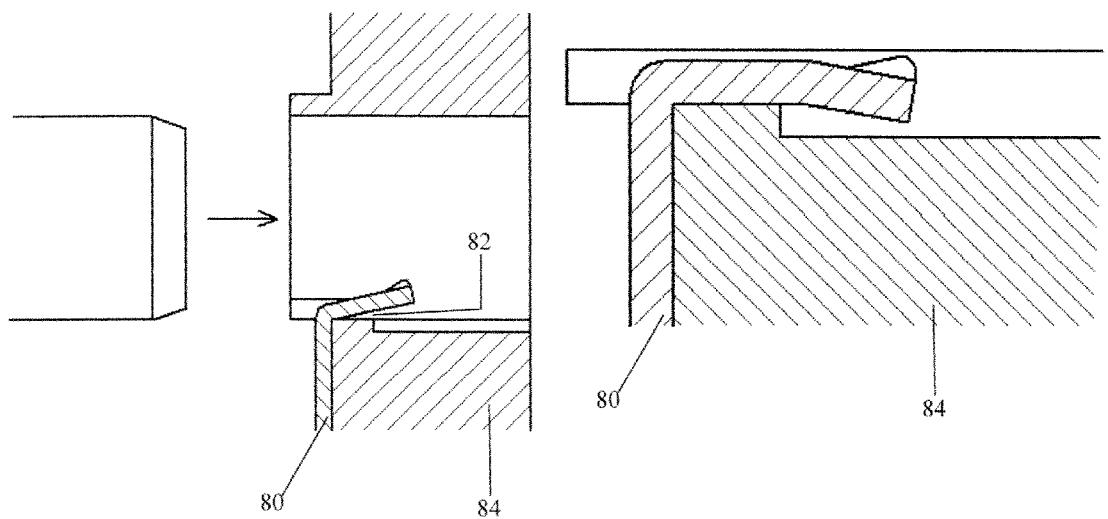
FIG. 6a
FIG. 6b
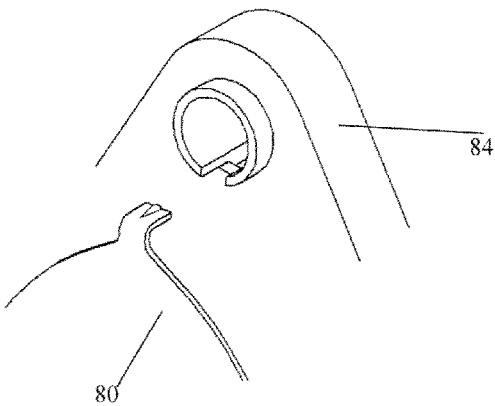
FIG. 6c

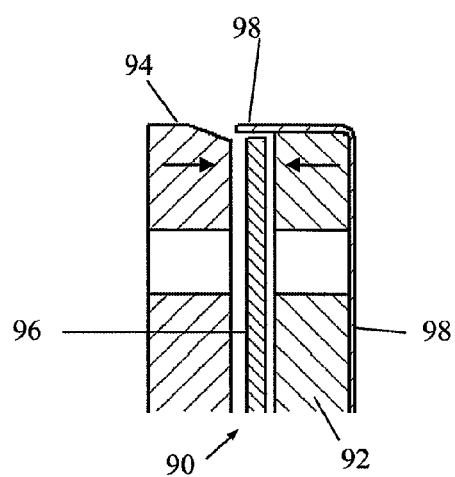
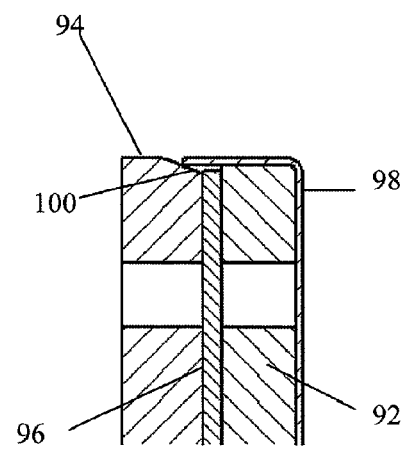
FIG. 7a  FIG. 7b
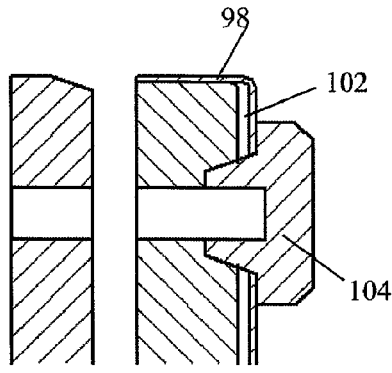
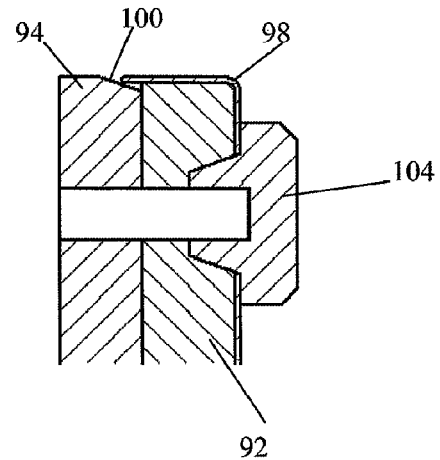
FIG. 7c  FIG. 7d

FLANGE ASSEMBLY WITH IMPROVED SERVICEABILITY

CROSS REFERENCE TO RELATED APPLICATIONS

This application claims the benefit of priority of U.S. Provisional Patent Application No. 61/042,364 filed Apr. 4, 2008, and U.S. Provisional Patent Application No. 61/051,730 filed May 9, 2008, which are incorporated herein by reference in their entirety.

FIELD OF THE INVENTION

The present invention is directed generally at joint assemblies. More specifically, the present invention is directed at a joint, or flange, assembly with improved serviceability.

BACKGROUND OF THE INVENTION

Joint and flange assemblies are used in many different technological fields and suffer from various disadvantages and problems. For example, with exhaust flanges that are used in the automotive industry, costs are increasingly becoming a critical factor in the manufacture of car parts and many companies are trying to reduce their costs by reducing their labor or material expenses. Another problem that manufacturers face is that their exhaust systems are required to meet emission standards over a predetermined period of time. As a result, individual parts within the exhaust system, such as exhaust flanges, must be fully operational during a warranty period, which can be a very difficult task.

Another problem faced by manufacturers of exhaust flanges is damage due to corrosion. Currently, exhaust flanges are manufactured entirely using standard carbon steel or stainless steel, but both of these materials have inherent disadvantages. Stainless steel exhaust flanges have adequate corrosion resistance but are costly to produce and therefore, the cost of replacing stainless steel exhaust flanges is relatively high. On the other hand, carbon steel exhaust flanges are cost-effective but typically corrode quickly and, as a result, are difficult to service within the warranty period.

It is therefore desirable to provide a novel joint assembly which overcomes at least one of the disadvantages of prior art joint assemblies.

SUMMARY OF THE INVENTION

It is an object of the present invention to obviate or mitigate at least one disadvantage of previous joint or flange assemblies.

In a broad aspect, there is provided a flange assembly comprising: a first flange portion having an interface for receiving a first end of a pipe; a second flange portion having an interface for receiving a second pipe; a set of fasteners extending through the first and second flange portions; and a set of attachment portions cooperating with one of the first or second flange portions for receiving the set of fasteners to secure the first and second flange portions together.

In another broad aspect, there is provided a joint assembly comprising: a first part; a second part; a set of fasteners; and a set of attachment portions cooperating with one of the first or second parts for receiving the set of fasteners to secure the first and second flange portions together.

In yet another broad aspect, there is provided an attachment portion for use with an assembly including at least one flange portion, the attachment portion comprising: an abutment portion; and an engagement portion, connected to the abutment portion, for cooperating with the at least one flange portion and for receiving a fastener for securing the assembly; wherein the attachment portion can be easily knocked out from the at least one flange portion when required.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 3a to 3d show embodiments in which one or more notches are provided for prying an attachment portion away from the first flange body;

FIG. 6a is a schematic diagram showing the first step in a method for pre-assembling gaskets;

FIG. 6b is a schematic diagram showing a second step corresponding to FIG. 6a;

FIG. 6c is a perspective view showing the positioning of the gasket for installation according to FIGS. 6a and 6b;

FIGS. 7a to 7d are a series of diagrams showing a flange assembly with a shield that engages a sloped edge of the second flange portion.

DETAILED DESCRIPTION

Generally, the present invention provides a joint, or flange, assembly including an attachment portion that provides improved serviceability, and in some embodiments, improved corrosion resistance.

Figure 1A:
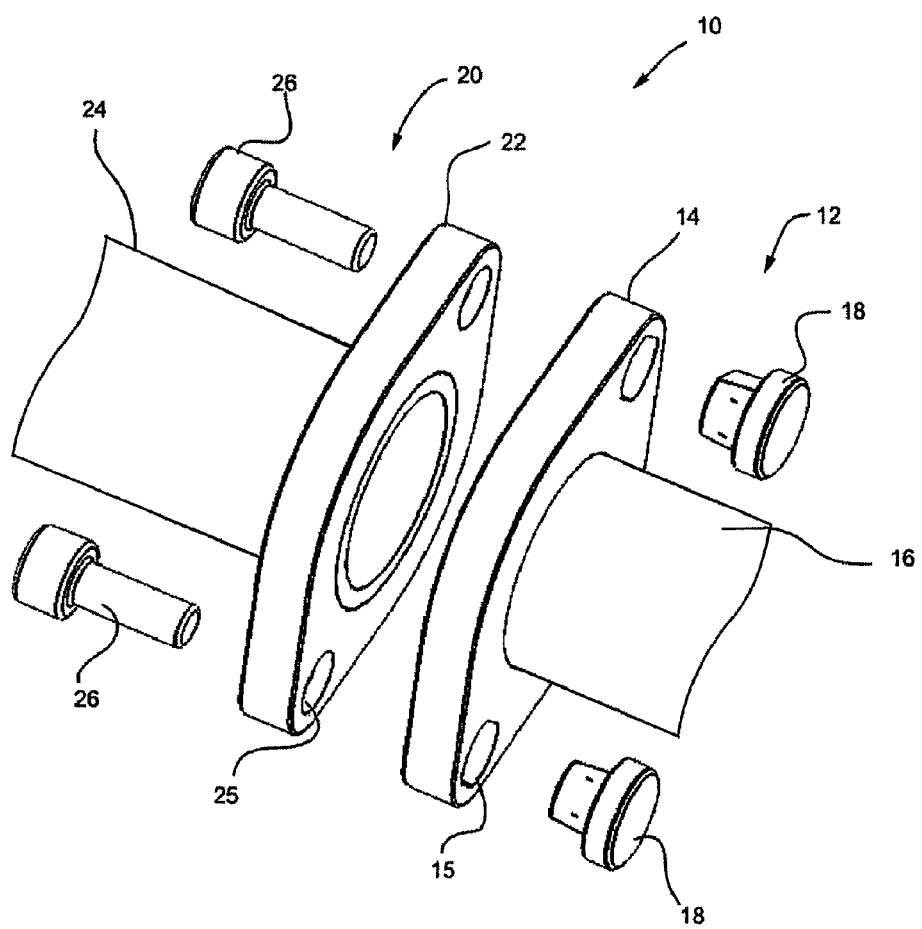
FIG. 1a is a perspective view of an embodiment of a flange assembly.

As will be understood, the described flange assembly can be used in any environment in which flange assemblies are required, such as the petrochemical industry, water treatment industry, and particularly, in the automobile industry for exhaust flanges. When used in an automobile, the flange assembly and attachment portion, and similar embodiments, can be used at any flange joint where improved serviceability would be beneficial Turning to FIG. 1a, a perspective view of an embodiment of a flange assembly 10 is shown. The flange assembly 10, or exhaust flange, includes a first portion 12, a second portion 22, a set of attachment portions, or knock outs, 18, and a set of fasteners, such as bolts, 26. The first portion 12 has a first, or first portion, flange body 14, which provides an interface for connecting to a first pipe 16, which may, for example, extend toward the direction of an engine (not shown). The first flange body 14 also has a first set of holes 15 for engaging the set of attachment portions 18.

The second portion 20 has a second, or second portion, flange body 22, which provides an interface for connecting to a second pipe 24. The second flange body 22 includes a set of holes 25 that corresponds to the set of holes 15 and attachment portions 18. When the first portion 12 and the second portion 22 are mated, the set of fasteners 26 is inserted through the sets of holes 25 and 15, and engaged by respective ones of the set of attachment portions 18. Although not shown in FIG. 1, a gasket can be placed between the first 12 and second 20 portions to provide a tighter seal between the two surfaces, as described below with respect to FIGS. 2, 5, 7a, and 7b. It will be understood that in an alternative embodiment, the attachment portions 18 can engage the second flange body 22 while the fasteners extend from the first portion 12.

Figure 1B:
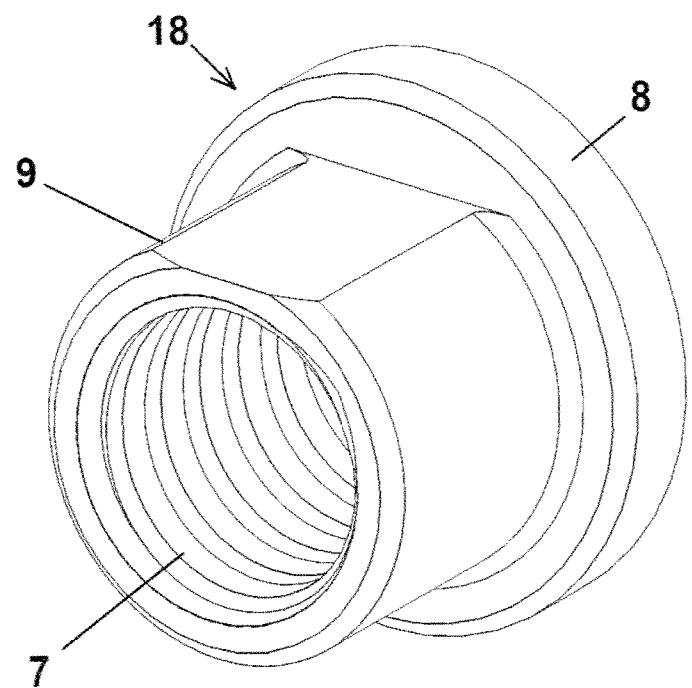
FIG. 1b is an axonometric projection of an embodiment of an attachment portion.

As shown in FIG. 1b, which is a perspective view of a first embodiment of an attachment portion, the attachment portion 18 has an engagement portion 9 which engages a respective hole, or recessed portion, 15 in the first flange body 14, an abutting, or abutment, portion 8 which abuts the first flange body 14, and a bore 7 which engages a respective fastener 26. In the preferred embodiment, the engagement portion 9 is connected axially to the abutment portion 8. In one embodiment, the bore 7 does not extend fully through the abutting portion, protecting the engaged fastener 26 from debris, and the attachment portions 18 can be secured to the first flange body 14 so that they do not become dislodged during transport of the first portion 12. A flat portion of engagement portion 9 restricts, or prevents the attachment portion 18 from rotating, or reduces the amount or rotation, within hole 15. Furthermore, the attachment portions 18 can also be secured to the first flange body 14 in a manner such that when the second portion 20 is to be disassembled from the first portion 12, the attachment portions 18 can be easily knocked out or pried away from the first flange body 14. Removal of the attachment portions 18 allows for new components, such as a new second portion 20, to be relatively easily installed when necessary. As will be understood, new attachment portions 18 are required to be assembled within the first flange body 14 before the new second portion 20 is installed. In an alternative embodiment, the bore 7 extends fully through both the engagement portion 9 and the abutting portion 8 such as shown in FIG. 2b.

Figure 1C:
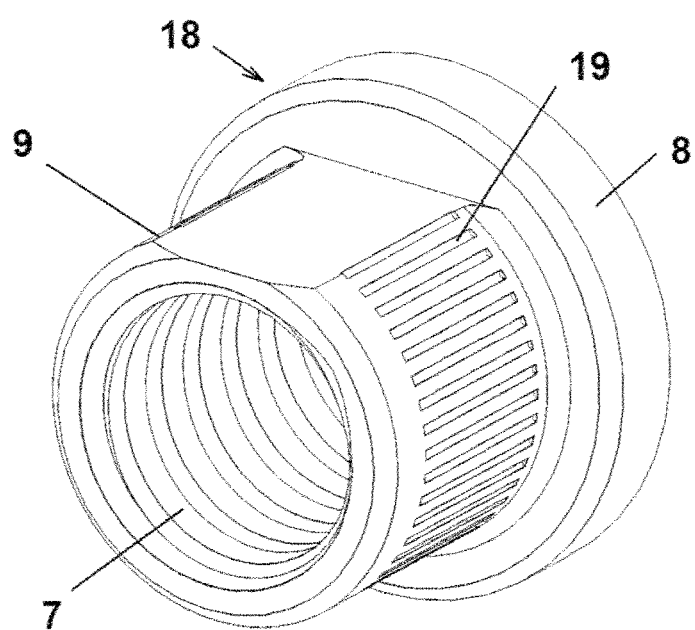
FIG. 1c is an axonometric projection of a further embodiment of an attachment portion with splines.

In a further embodiment shown in FIG. 1c, the attachment portion 18 can be secured to the first flange body 14 by providing splines 19 or knurling on the engagement portion of each of the set of attachment portions 18.

Figure 1D:
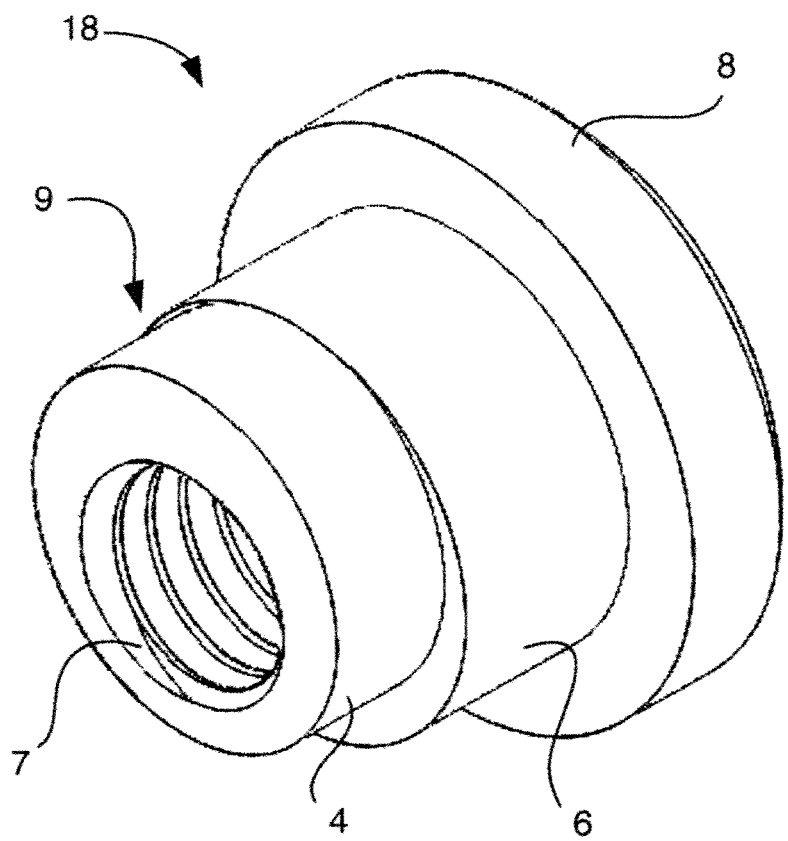
FIG. 1d is an axonometric projection of an embodiment of an attachment portion in which the engagement portion includes an eccentric portion for preventing rotation of the attachment portion.

In yet another embodiment, FIG. 1d shows an attachment portion 18 in which the engagement portion 9 comprises a concentric portion 6 that is concentric relative to the bore 7, and an eccentric portion 4 that is eccentric relative to the bore 7. The attachment portion 18 is intended to cooperate with the first flange body that is correspondingly shaped to receive the engagement portion 9. The eccentric portion 6 prevents rotation of the attachment portion 18 about the axis of bore 7.

Figure 1E:
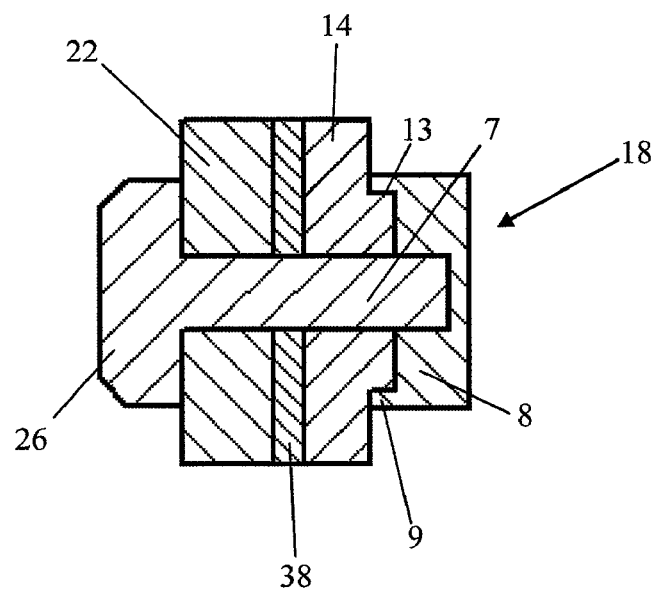
FIG. 1e is a cross section of another embodiment of an attachment portion in which the engagement portion does not extend into a flange body.

In another embodiment, FIG. 1e shows an attachment portion 18 having an engagement portion 9 that defines a circular recess. In this embodiment, the bore 7 extends at least partially through the abutment portion 8, but not through the engagement portion 9. The circular recess engages a correspondingly raised portion 13 of first flange body 14, creating a pressed fit that prevents unintentional dislodgement or rotation of the attachment portion 18. However, the attachment portion 18 can be easily knocked out or pried away from first flange body 14 for improved serviceability.

Figure 2A:
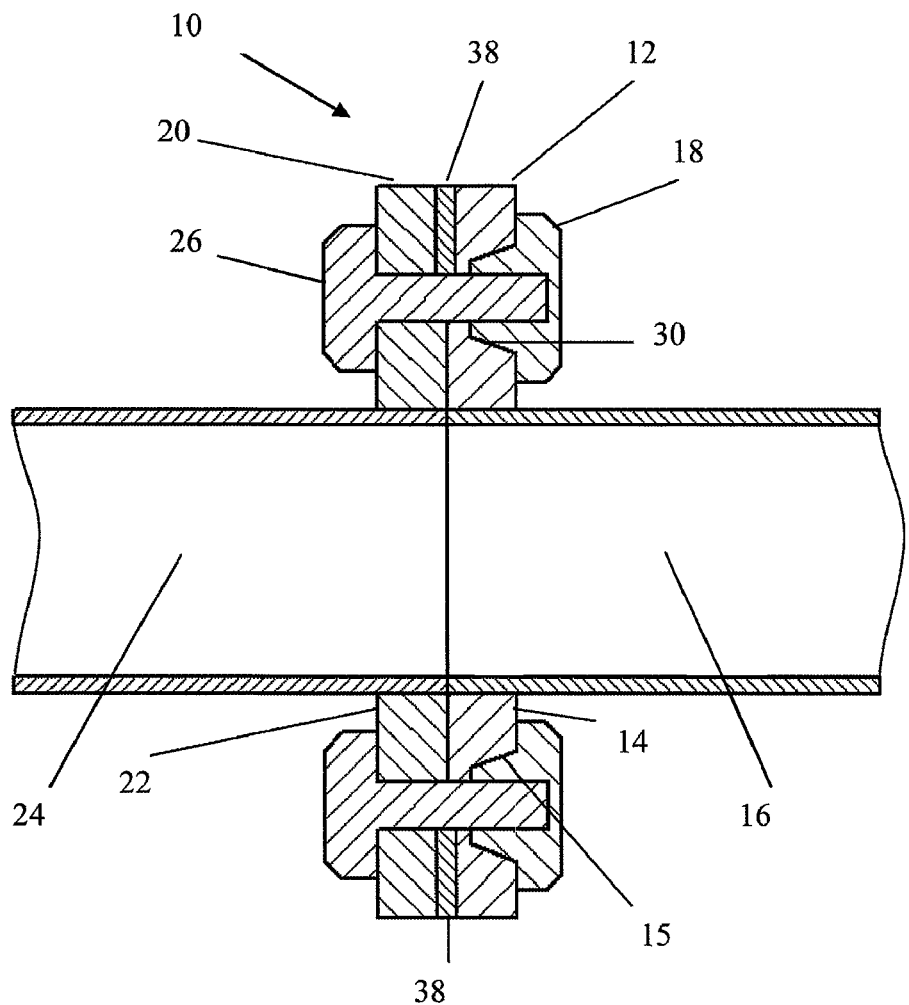
FIG. 2a is a cross section of an embodiment of a flange assembly in which the set of attachment portions and the set of holes have correspondingly tapered surfaces.
Figure 2B:
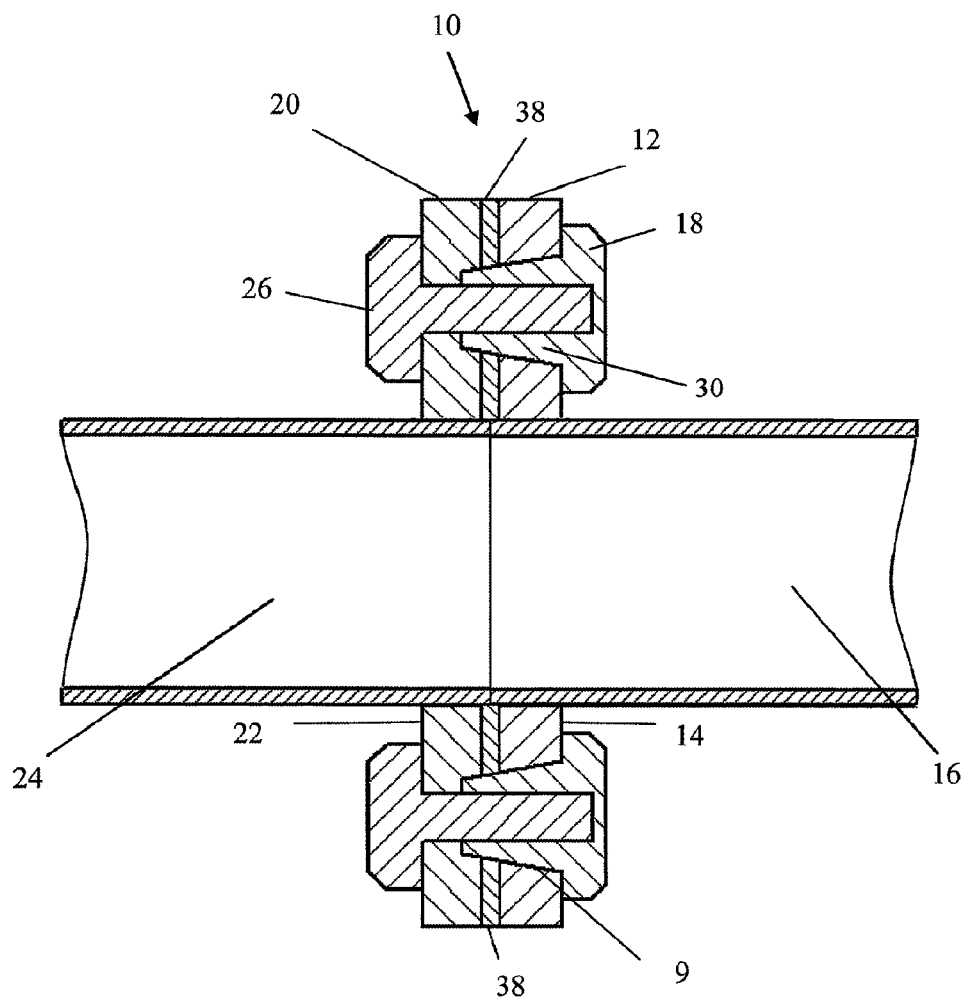
FIG. 2b is a cross section of a further embodiment of a flange assembly in which the attachment portions extend through the first flange body and into the second flange body.

FIG. 2a show a cross section of another embodiment of a flange assembly 10 with first 12 and second 20 portions in a mated position. In this embodiment, the first flange body 14 and the second flange body 22 can be manufactured from a material such as carbon steel. As shown, the first portion 12 is mated to the second portion 20 with a gasket 38 between the first 14 and second 22 flange bodies, and the first 12 and second 20 portions locked in place by the set of fasteners 26 engaging with the set of attachment portions 18. In this embodiment, each one of the set of attachment portions 18 includes a tapered engagement portion 30, and each one of the set of holes 15 is correspondingly tapered so that the set of attachment portions 18 cooperate with or can be secured to the first flange body 14 when the two are pressed together. In a further embodiment, the set of attachment portions 18 can be secured to the first flange body 14 by providing splines or knurling 19 on the engagement portion of each of the set of attachment portions 18.

FIG. 2b shows a cross-section of another embodiment of a flange assembly 10 with first 12 and second 20 portions in a mated position. In this embodiment the engagement portions 9 of the attachment portions 18 are greater than the width of the first portion 12, and extend through the first portion 12 and into second portion 20, which is correspondingly recessed to receive the engagement portions 9. The engagement portions 9 hold a gasket 38 in place and serve as a barrier to external elements, providing protection to the flange assembly from corrosion causing debris. Additionally, the engagement portions 9 provide flange assembly 10 with an additional source of load-bearing ability. The cooperation of the engagement portions 9 with the second portion 20 supports the joint against sheering and bending, which increases the strength of the flange assembly 10 without using more resilient, and typically more costly, materials. Moreover, less of the fasteners 26 is exposed and unsecured when the fasteners 26 are secured in the attachment portions 18, and the fasteners 26 are therefore less susceptible to the high heat and stretch that is typically experienced by a flange assembly, especially in an automotive environment. This makes it possible to select materials for the fasteners 26 that have more conventional stretch under high heat conditions. In most known flange assemblies, there is no attachment portion 18 and therefore the end of the fastener 26 is exposed after the edge of the first flange body. This can lead to a higher rate of wear and tear, or damage, to the fastener 26 under operating conditions.

Turning to FIGS. 3a to 3d, several embodiments are shown in which an attachment portion 18 is engaging a hole in the first flange body 14. FIG. 3a shows a cross section of an embodiment in which the edge of the flange body 14 includes a notch 32 adjacent the attachment portion 18. In this embodiment, the attachment portion 18 can be disengaged from the first flange body 14 and the fasteners 26 by using a tool, such as a screwdriver, puller or similar tool, as the notch 32 provides a recessed access area in which the tool can be inserted. As shown in FIGS. 3b to 3d, the flange body 14 can include up to three notches, or slots, whereby the tool can be inserted to pry the attachment portion 18 away from the first flange body 14.

Alternatively, the set of attachment portions 18 can also be knocked out of the first flange body 14 using various methods as necessary during servicing. In one method, the fasteners 26 can be removed, or unscrewed, and the attachment portion 18 knocked out. In another method, the head of the fasteners 26 can be cut away and the stem of the fasteners 26 and the attachment portion 18 knocked out of the holes. In yet a further method, the attachment portion 18 can be removed by pulling the attachment portion 18 away from the first flange body 14.

Figure 4:
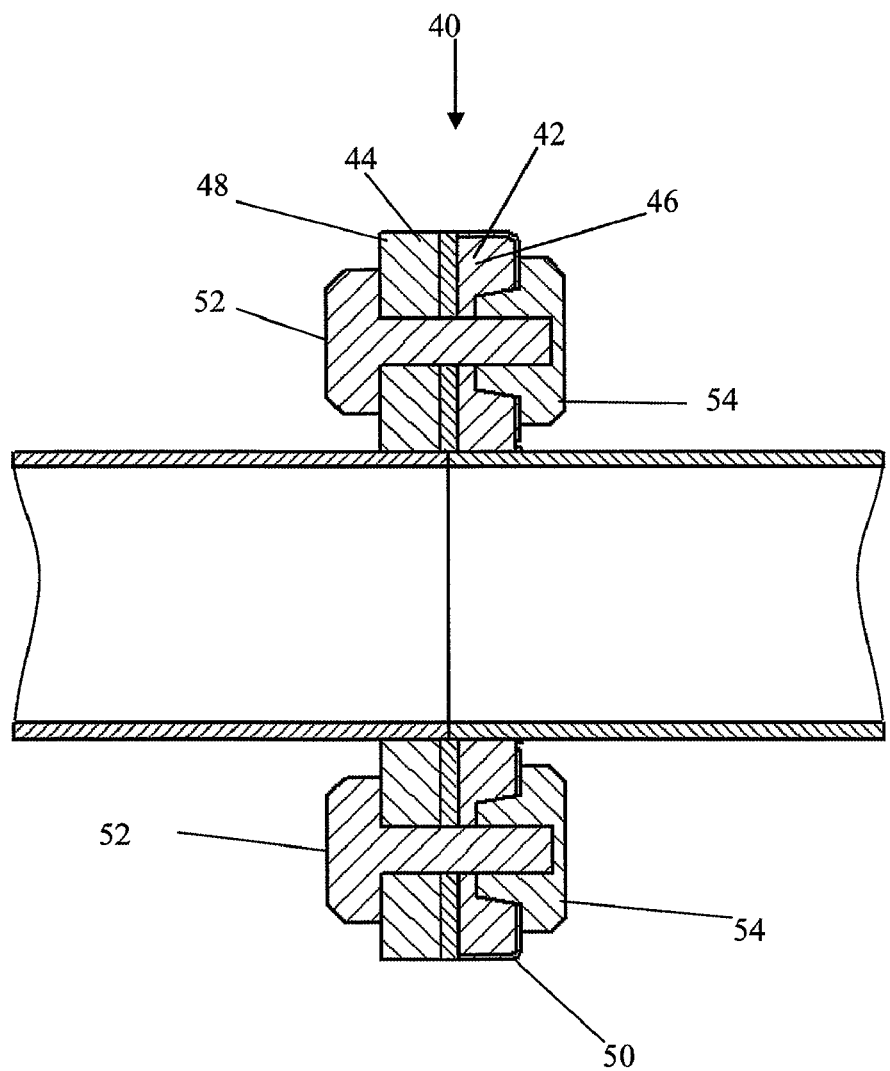
FIG. 4 is a cross section of an embodiment of a flange assembly further comprising a corrosion-resistant shield.

Turning to FIG. 4, a cross section of a further embodiment of a flange assembly 40 is shown. In this embodiment, the flange assembly 40 includes a first portion 42 and a second portion 44, the portions including a first 46 and a second 48 flange body, respectively. The first 42 and second 44 portions are held in place by a set of fasteners 52 which are locked in place by a set of attachment portions 54. The second flange body 48 is preferably manufactured from a material such as carbon steel, while the first flange body 46 is also manufactured from carbon steel with a corrosion-resistant shield 50 or shell, made of stainless steel. The shield 50 assists in protecting the flange assembly 40 from external conditions, such as the environment or corrosion causing debris. The shield 50 can be placed over the first flange body 46 or can be bonded, secured, or fastened to the first flange body 46. A gasket can be inserted between the two flange bodies in order to provide a tighter seal between the surfaces of the flange bodies. It will be understood that in alternative embodiments, the shield can be applied to the second flange body 48.

In an alternative embodiment, rust protection can be applied between the shield and the first flange body 46 to provide further protection from corrosion. In yet another embodiment, in order to reduce the amount of rust-causing debris from entering between the shield 50 and first flange body 46, one can peen over the edge between the shield 50 and the first flange body 46 to provide a better seal.

Figure 5A:
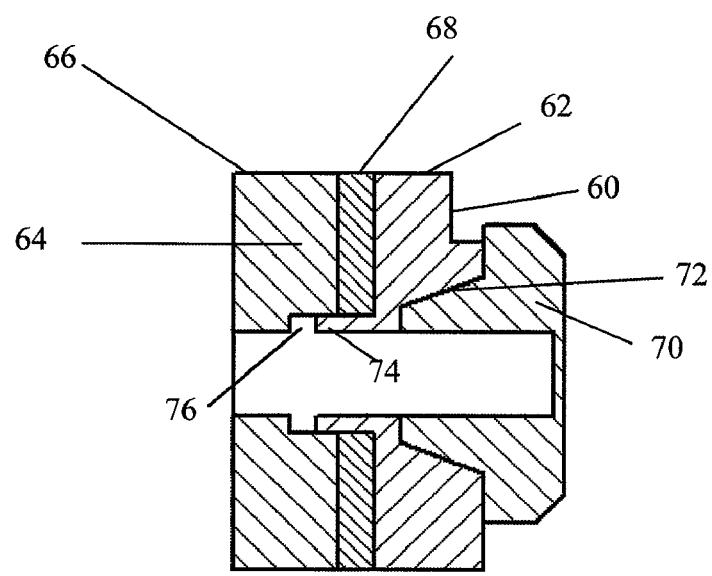
FIG. 5a is a cross-sectional view of an embodiment of a flange assembly in which the first portion has a protrusion for engaging a recessed portion in the second portion.

Turning to FIG. 5a, a cross-section of another embodiment showing the mating between a first portion 62 and a second portion 66 is shown. A first flange body 60 of the first portion 62 is mated with a second flange body 64 of the second portion 66 with a gasket 68 located therebetween to provide a tighter seal between the surfaces of the first 60 and second 64 flange bodies. An attachment portion 70, having a tapered engagement portion 72, is located within a hole in the flange first body 60, for receiving a fastener (not shown), which locks the first 60 and the second 64 flange bodies in place. The second flange body 64 includes a recessed portion 76 which receives a protrusion 74 extending from the first flange body 60. The protrusion 74 can extend up to the full thickness of the flange joint, and the cooperation of the protrusion 74 and the recessed portion 76 assists in aligning the first 60 and the second 66 portions with respect to each other, acting as an interference rib for securing the gasket 68 during the assembly of the flange assembly, and holding the gasket 68 in place after assembly. Furthermore, the cooperation of the protrusions 74 with the recessed portions 76 provides the flange assembly with additional load-bearing ability by supporting the joint against sheering and bending, which increases the strength of the flange assembly without using more resilient, and typically more costly, materials.

An advantage of this embodiment is that when the protrusions 74 bear the load of the system, the strength requirement for the fastener is reduced. The protrusions 74 also provide protection of the flange assembly from corrosion causing debris as it serves as a barrier to external elements. In a further embodiment, the attachment portion 70 can provide further coverage of the fastener past the abutting edge of the first flange body 60. In an alternative embodiment, the first flange body 60 includes a recessed portion for receiving a protrusion that extends from the second flange body 64.

In an alternative embodiment discussed earlier and shown in FIG. 2b, instead of the protrusion 74 being part of the first flange body 60, the protrusion 74 is provided by the attachment portion 70 by extending the engagement portion of the attachment portion 70 into the recessed portion 76 of second flange body 64, including up to the full thickness of the flange joint.

Figure 5B:
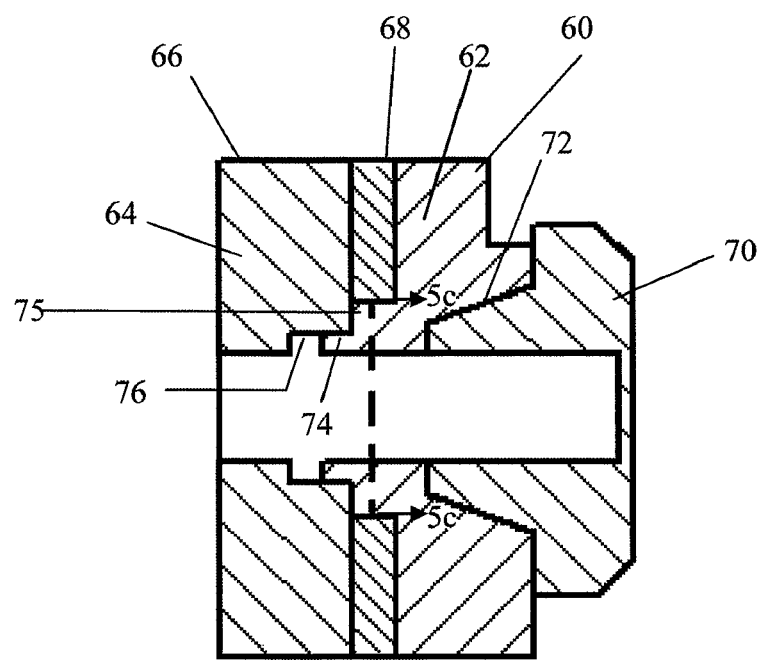
FIG. 5b is a cross-sectional view of a further embodiment of a flange assembly in which the first portion has a protrusion, with an augmented interference rib, for engaging a recessed portion in the second portion.
Figure 5C:
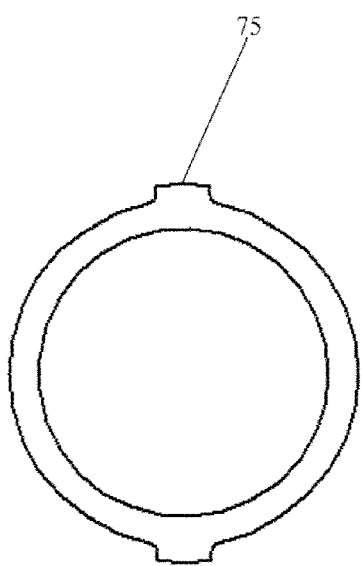
FIG. 5c is a view of the embodiment shown in FIG. 5b taken along line 5c.

FIG. 5b shows a further embodiment in which protrusion 74 has an augmented interference rib 75 that retains gasket 68 in position by an interference fit during and after assembly of the flange assembly. FIG. 5c shows a view taken along line 5c in FIG. 5b of first flange body 60 with lips 75 extending from protrusions 74.

Figure 5D:
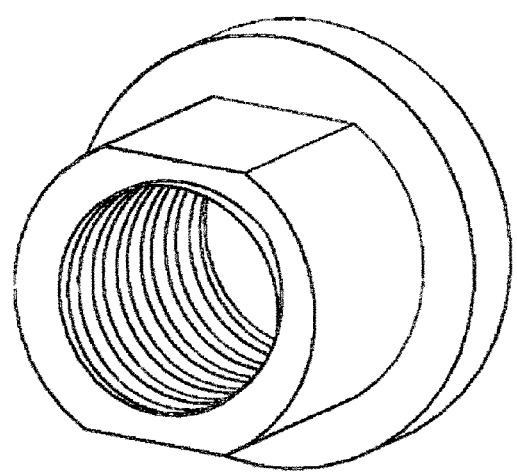
FIG. 5d is an axonometric projection of an attachment portion with a tapered engagement portion.

In FIG. 5d, a further embodiment of an attachment portion 70 is shown. In this embodiment, the attachment portion 70 can include a prevailing torque feature, which acts as a locking feature. An advantage is that it is more cost effective to place this feature on the attachment portion 70 rather than on other parts of the flange assembly, thereby lowering the cost of the overall flange and/or flange assembly.

Turning to FIG. 6, a method of pre-assembling a gasket is provided. The gasket 80 is initially placed over a protrusion 82 located on a flange body 84, typically the replacement flange body. The gasket 80 can then be crimped so that the edge of the gasket 80 is bent slightly downwards so that the gasket is somewhat locked in position.

Turning to FIGS. 7a to 7d, partial views of another embodiment are shown. In FIG. 7a, the flange assembly 90 includes a first flange body 92 and a second flange body 94. A gasket 96 is located between the first flange body 92 and the second flange body 94 to assist in providing a tighter seal between the two flange bodies when they are mated together. The first flange body 92 includes a shield 98 which provides added protection to the flange assembly 90. The shield 98 is similar to the shield 50 discussed in the description of FIG. 4.

In one embodiment, when manufacturing a flange from a mixture of carbon or stainless steel and hexagonal Boron Nitride ("hBN"), when the flange is sintered the hBN material rises to the surface away from the carbon or stainless steel to provide the protective outer shield around the flange body such that the shield 98 is made from hBN. The shield 98 or shell, reduces or prevents corrosion by protecting the joint from corrosion and/or erosion causing debris. Generally, the hBN material provides improved protection over regular carbon or stainless steel.

As shown in FIG. 7b, when the first flange body 92 is urged towards the second flange body 94, the shield 98 contacts a sloped portion 100 of the second flange body 94 to create a seal which is held in place when the fasteners is fully engaged with the attachment portion.

In some cases, the edge of the shield 98 can be damaged in transit when it is transported with first flange body 92, as a portion of the shield hangs over the edge of the first flange body 92. FIGS. 7c and 7d show a method for avoiding such damage. FIG. 7C shows this embodiment, in which prior to delivery, the shield 98 is placed over the first flange body 92 with a small gap 102 between the first flange body 92 and the shield 98 and held together with enough friction to remain intact during shipment but not enough to prevent a fastener from tightening the flange during assembly. In this manner, the edge of the shield 98 is aligned with the edge of the first flange body 92 so that there is less concern or fear that the edge of the shield 98 will be damaged during transit. In this position, an attachment portion 104 can be partially engaged with a hole in the first flange body 92.

As shown in FIG. 7d, once the first flange body 92 and the shield are delivered, a fastener can be tightened in cooperation with the attachment portion 104, tightening the first 92 and second 94 flange bodies with respect to each other and forming a seal between the shield 98 and the sloped portion 100 of the second flange body. The seal between the first 92 and second 94 flange bodies reduces or prevents corrosion causing debris from entering the joint. Although not shown, a gasket can also be located between the first 92 and second 94 flange bodies to provide a tighter seal.

Figure 8:
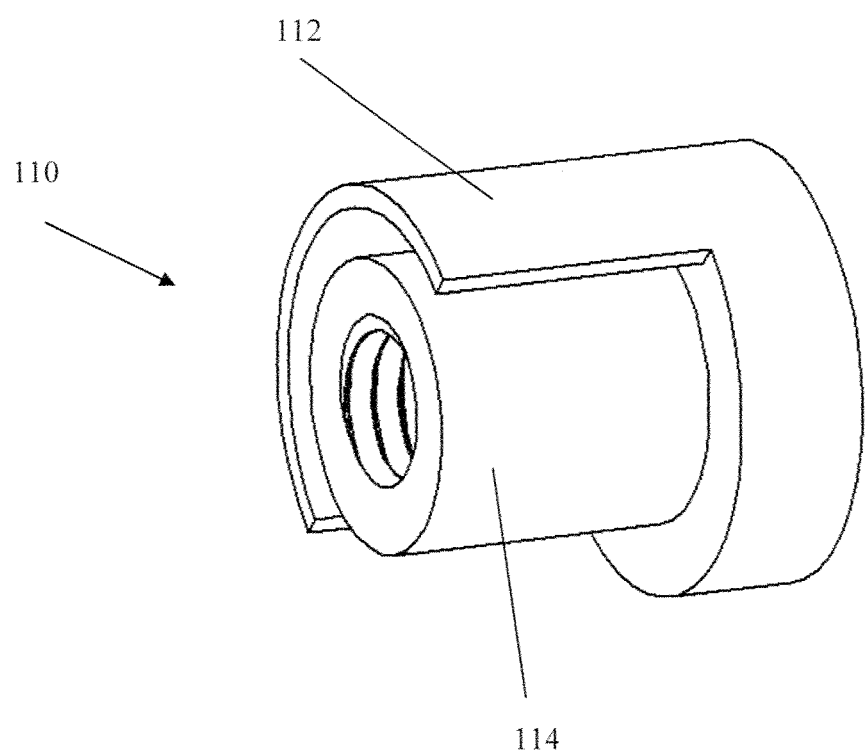
FIG. 8 is a perspective view of an attachment portion with a partial shield.

Turning to FIG. 8, a perspective view of an embodiment of an attachment portion 110 having a partial shield 112 is shown. As with the other embodiments, the engagement portion 114 of the attachment portion 110 is inserted into a hole in a flange body to receive a fastener which is used to tighten the flange portions together to form a flange assembly. When the attachment portion 110, engages the flange body, the partial shield 112 partially covers the joint portion between the first and second flange bodies to protect the flange assembly from possible corrosion and erosion. In this embodiment, the partial shield 112 is located over the area which is most susceptible to corrosion or erosion for cost effectiveness of the flange assembly. For example, if the attachment portion 110 is used in the embodiment shown in FIG. 5a, the partial shield 112 provides a cover for the joint between the first 60 and the second 64 flange bodies.

In another embodiment, the flange bodies can be manufactured from powder metal so that the holes in the flange body can be shaped to any dimension. In this manner, the holes can be shaped to fit any shape or size of fastener or attachment portion. Furthermore, a protrusion can be any size or shape. Therefore, the geometry of the protrusions and holes may be selected to vary the load-bearing characteristics of the flange assembly to meet the to load-bearing requirements for different conditions. For example, just as an I-beam is designed to take a bending load, the protrusion geometry can be designed to take the load in the specific flange application.

In another embodiment, the flange bodies can include means for receiving one or more extra pins, such as pins manufactured from powder metal or dowel pins, to increase the overall sheer strength. This also allows each of the set of fasteners to be reduced in diameter thereby improving cost effectiveness for the flange assembly. The pin or pins can be a separate part or can be integral with one or both flange portions.

In yet another embodiment, when manufacturing the flange from powder metal, the weight and cost of the flange body can be controlled since the load bearing requirements are being handled by other areas or parts of the flange assembly and there is an improved method of focusing the load bearing while providing improved serviceability. This can increase the weight in those areas but in areas of less loads, the weight structure of these areas can be adjusted accordingly to reduce weight and cost.

In another embodiment, the features described in the above embodiments are applied to a manifold flange. Application of the features described in the above embodiments, including the use of the set of attachment portions, in a manifold flange, such as (1) stamp or tubular/fabricate flanges or (2) cast manifold flanges, provides improved serviceability over conventional manifold flanges. In this embodiment, a set of fasteners extend through a first part, or portion, such as a manifold flange, and a second part, or portion, such as an engine block. A set of attachment portions engages or cooperates with either the first or second part, and receives the set of fasteners to secure the first and second parts together.

In the preceding description, for purposes of explanation, numerous details are set forth in order to provide a thorough understanding of the embodiments of the invention. However, it will be apparent to one skilled in the art that these specific details are not required in order to practice the invention. For greater clarity, the above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. An exhaust flange assembly comprising:
   first and second flanges for respectively receiving ends of first and second pipes to be joined, said flanges being securable to each other to join said pipes, said flanges, when abutted against each other, having at least two opposing holes therethrough; and
   fastening means positionable through said opposing holes to secure said flanges to each other, said fastening means comprising, for each pair of said at least two opposing holes:
   an attachment portion positionable into a first said opposing hole and securable against rotation in said first hole, said attachment portion having an abutting portion outside said first said opposing hole to contact the flange and an engagement portion extending into the first said opposing hole, wherein said securing of said attachment portion against rotation is by said engagement portion, wherein said engagement portion of said attachment portion is configured so as to extend only partially through the first said opposing hole, at least the engagement portion of the attachment portion having a threaded bore, the bore not extending fully through said attachment portion; and
   a bolt positionable through the opposing hole of the other said flange, for screwing into said threaded bore so as to secure the flanges to each other; and
   wherein one of said flanges has a recess around each of its said holes, and the other of said flanges has a corresponding protrusion around each of its said holes, each said protrusion fitting into a said recess so as to overlap the planes of opposing surfaces of said first and second flanges.

2. An exhaust flange assembly as in claim 1, said engagement portion having at least a portion thereof being non-circular in transverse cross-section, the first said opposing hole intended to receive said engagement portion being correspondingly shaped.

3. An exhaust flange assembly as in claim 1, said engagement portion having at least a portion thereof which is eccentric relative to said bore of said engagement portion.

4. An exhaust flange assembly as in claim 1, said engagement portion having at least a portion thereof being provided with longitudinal splines, sized to create a press fit between said engagement portion and the first said opposing hole intended to receive said engagement portion, sufficiently tight for said attachment portion not to rotate as said bolt is screwed into said threaded bore.

5. An exhaust flange assembly as in claim 1, wherein said flange intended to receive said attachment portion has a notch positioned so that a tool can be inserted between said flange and said abutting portion of said attachment portion, thereby facilitating removal of said attachment portion.

6. An exhaust flange assembly as in claim 1, wherein one of said first and second flanges has a shield overlying it to assist in protecting that flange.

7. An exhaust flange assembly as in claim 6, wherein said shield extends beyond said flange to at least partially overlap onto the other flange.

8. An exhaust flange assembly as in claim 1, further comprising a gasket positioned between opposing surfaces of said first and second flanges.

9. An exhaust flange assembly as in claim 8, wherein said gasket includes a portion which can be crimped into a notch in one of said bores, to aid in holding the gasket in position prior to and during securing said flanges to each other.

10. An exhaust flange assembly as in claim 8, wherein said gasket and said protrusion are sized so that said protrusion acts as an interference rib for holding the gasket in place during assembly of the flange assembly.

11. An exhaust flange assembly as in claim 8, wherein one of said first and second flanges has a shield overlying it to assist in protecting that flange.

12. An exhaust flange assembly as in claim 11, wherein said shield extends beyond said flange to at least partially overlap onto the other flange.

\* \* \* \* \*